(12) United States Patent
Zhang et al.

(10) Patent No.: US 9,042,292 B2
(45) Date of Patent: May 26, 2015

(54) METHOD AND SYSTEM FOR DETERMINING MAPPING RELATIONSHIP BETWEEN MULTICAST BROADCAST SINGLE FREQUENCY NETWORK AREA AND SERVICE AREA

(75) Inventors: Dajun Zhang, Beijing (CN); Xiaodong Yang, Beijing (CN)

(73) Assignee: China Academy of Telecommunications Technology, Beijing (CN)

( * ) Notice: Subject to any disclaimer, the term of this patent is extended or adjusted under 35 U.S.C. 154(b) by 351 days.

(21) Appl. No.: 13/521,430

(22) PCT Filed: Jan. 11, 2011

(86) PCT No.: PCT/CN2011/070187
§ 371 (c)(1),
(2), (4) Date: Jul. 10, 2012

(87) PCT Pub. No.: WO2011/082699
PCT Pub. Date: Jul. 14, 2011

(65) Prior Publication Data
US 2012/0287838 A1    Nov. 15, 2012

(30) Foreign Application Priority Data
Jan. 11, 2010 (CN) .......................... 2010 1 0033772

(51) Int. Cl.
*H04W 72/00* (2009.01)
*H04W 4/06* (2009.01)
*H04W 76/00* (2009.01)

(52) U.S. Cl.
CPC .......... *H04W 72/005* (2013.01); *H04W 76/002* (2013.01); *H04W 4/06* (2013.01)

(58) Field of Classification Search
None
See application file for complete search history.

(56) References Cited

U.S. PATENT DOCUMENTS

| 8,780,777 B2* | 7/2014 | Cai ............................... 370/312 |
| 2011/0021224 A1* | 1/2011 | Koskinen et al. ............. 455/507 |
| 2011/0058513 A1* | 3/2011 | Ai et al. ........................ 370/312 |

(Continued)

FOREIGN PATENT DOCUMENTS

| CN | 101370163 A | 2/2009 |
| CN | 101420655 A | 4/2009 |

(Continued)

OTHER PUBLICATIONS

3GPP TS 36.443 V.9.0.0, Dec. 2009, pp. 1-71.*
3GPP Organizational Partners, "3GPP TS 36.443 V9.0.0, 3rd Generation Partnership Project; Technical Specification Group Radio Access Network; Evolved Universal Terrestrial Access Network (E-UTRAN); M2 Application Protocol (M2AP) (Release 9)," Dec. 31, 2009, 71 pages.

(Continued)

*Primary Examiner* — Benjamin H Elliott, IV
*Assistant Examiner* — Eric Nowlin
(74) *Attorney, Agent, or Firm* — Alleman Hall McCoy Russell & Tuttle LLP

(57) ABSTRACT

The present invention discloses a method and system for determining a mapping relation between the MBSFN area and the service area, wherein the method includes: an eNB sends an M2 setup request message to an MCE; the MCE allocates MBSFN area identities and sends a message with a mapping relation between the MBSFN area and the service area to the eNB; and the eNB acquires the mapping relation between the MBSFN area and the service. By the technical scheme of the invention, the mapping relation between the MBSFN area and the MBMS area can be defined, thus ensuring the synchronization transmission demand of the MBSFN with air interfaces.

16 Claims, 5 Drawing Sheets

(56) References Cited

U.S. PATENT DOCUMENTS

2012/0040603 A1* 2/2012 Wang et al. .................. 455/3.01
2012/0044850 A1* 2/2012 Wang ............................ 370/312
2012/0281610 A1* 11/2012 Ai et al. ........................ 370/312
2013/0215817 A1* 8/2013 Lu et al. ........................ 370/312

FOREIGN PATENT DOCUMENTS

| CN | 101505452 A | 8/2009 | | |
|----|----|----|----|----|
| WO | 2008153474 A1 | 12/2008 | | |
| WO | WO/2009/132565 | * | 4/2009 | ............. H04W 4/06 |

OTHER PUBLICATIONS

CATT, "Signalling of the Mapping Relation of MBSFN Area ID and MBMS Service Area by M2, 3GPP TSG-RAN3 Meeting #66bis, R3-100300," http://www.3gpp.org/ftp/tsg_ran/WG3_Iu/TSGR3_66bis/Docs/R3-100300.zip, Jan. 15, 2010, 3 pages.

CATT, "Signalling of the Mapping Relation of MBSFN Area ID and MBMS Service Area by M2, 3GPP TSG-RAN3 Meeting #66bis, R3-100300," http://www.3gpp.org/ftp/tsg_ran/WG3_Iu/TSGR3_66bis/Docs/R3-100301.zip, Jan. 15, 2010, 2 pages.

ISA China, International Search Report of PCT/CN2011/070187, Apr. 7, 2011, WIPO, 3 pages.

* cited by examiner

METHOD AND SYSTEM FOR DETERMINING MAPPING RELATIONSHIP BETWEEN MULTICAST BROADCAST SINGLE FREQUENCY NETWORK AREA AND SERVICE AREA

CROSS REFERENCE TO RELATED APPLICATIONS

The present application is the U.S. National Phase of PCT/CN2011/070187, filed Jan. 11, 2011, and entitled "METHOD AND SYSTEM FOR DETERMINING MAPPING RELATIONSHIP BETWEEN MULTICAST BROADCAST SINGLE FREQUENCY NETWORK AREA AND SERVICE AREA," which claims priority to Chinese Application Serial No. 201010033772.7, filed Jan. 11, 2010, and entitled "METHOD AND SYSTEM FOR DETERMINING MAPPING RELATIONSHIP BETWEEN MULTICAST BROADCAST SINGLE FREQUENCY NETWORK AREA AND SERVICE AREA," the entire contents of each of which are hereby incorporated by reference for all purposes.

FIELD OF THE INVENTION

The invention relates to the communication field, and in particular relates to a method and system for determining a mapping relation between a multicast broadcast single frequency network area and a service area.

BACKGROUND OF THE INVENTION

The multimedia broadcast multicast service (MBMS) is used for providing multimedia broadcast and multicast services for users in wireless cells. In a long term evolution (LTE) system, the MBMS can be provided in a frequency layer dedicated for the MBMS and a frequency layer shared with a non-MBMS. An LTE cell for supporting the MBMS can be either a dedicated MBMS cell or an MBMS/unicast mixed cell. Both single-cell transmission and multi-cell transmission can be used for the MBMS, but the multi-cell transmission of the MBMS is required to support a multicast broadcast single frequency network (MBSFN) transmission mode.

The MBSFN refers to the synchronization transmission in a plurality of cells with the same frequency at the same time. The MBSFN is adopted so as to save frequency resources and improve utilization rate of frequency spectrum. The plurality of cells are required to send the identical contents simultaneously so that the plurality of MBSFN cells can be regarded as one big cell by a user equipment (UE) receiver. Hence, Rather than being influenced by inter-cell interference from adjacent cell transmission, the UE is beneficial from superposition of signals from the plurality of MBSFN cells. The MBSFN transmission mode can be adopted by both the dedicated MBMS cell and the MBMS/unicast mixed cell. In addition, the time difference of multipath transmission can be solved by using an advanced UE receiver technology, thus eliminating inter-cell interference. A diversity effect caused by the same frequency transmission can be used to solve coverage problem and other problems so as to strengthen the receiving reliability and improve the coverage rate.

The technical characteristics of the multi-cell transmission of the MBMS are as follows: (1) the synchronous transmission of the MBMS in an MBSFN area, (2) supporting for combining multi-cell MBMS transmission, (3) mapping of a multicast traffic channel (MTCH) and a multicast control channel (MCCH) on MCH physical channels for point-to-multipoint (PTM) transmission, and (4) available semi-static configuration in an MBSFN synchronization area by, e.g., operation & maintenance (O&M).

Logical channels related to the MBMS transmission mainly include broadcast control channels (BCCHs), MCCHs and MTCHs. The main functions of the logical channels lie in as follows.

The BCCHs are used for broadcasting system information to the UE by network. In regard to the MBMS, configuration information (i.e. MCCH repeating period, offset of a start sub-frame, amount of occupied sub-frames, and PLC UM mode configuration, etc.) of the MCCHs is carried by the BCCHs so that the UE can find out the position of MCCH resource. While specific MBMS information is not carried in the BCCHs.

The MCCHs are downlink PTM channels and used for transmitting control information related to the MBMS in an MBSFN area to the UE by the network. One MCCH may correspond to one or more MTCHs (that is, the control information of the multiple MTCHs may be carried). The MCCHs may include configuration information (e.g. MSAP and period of MSAP occasion) of physical multicast channels (PMCH or MCH), MBMS radio bearer (RB) information (e.g. RBs provided in the update cycle of one MCCH), MBMS session Start, and MBMS Session Stop, etc.

The MTCHs are downlink PTM channels and used for sending specific MBMS data to the UE by the network.

The network uses the BCCHs to indicate the MCCH configuration information to the UE and then uses the MCCHs to provide MTCH information for bearing specific services for the UE. Thus, the UE can receive the MBMS on the MTCHs.

The relation between an MBMS area and the MBSFN synchronization area is shown that the MBMS area is composed of one or more service identifier, each of which is mapped into one or more cells. And the MBMS area is taken to an eNB by a broadcast-multicast service center (BM-SC) in a session message. The MBSFN area comprises one group of cells which carry out synchronous transmission of the MBSFN in the synchronization area. And the MBSFN area is planned by a multicast coordination entity (MCE) in accordance with strategies of operators and is notified to the eNB in an M2 interface message. The reserved cells of the MBSFN area belong to the synchronization area and do not carry out transmission of the MBSFN.

In the prior art, the eNB configures MBMS areas belonging to the cells by O&M and then notifies the MCE by an M2 setup request message, and the MCE allocates MBSFN area identities in accordance with the strategies and returns to the eNB. However, the MBSFN area may be different from a service area, so the corresponding relation between the MBMS control information and service information should be clarified when those two are transmitted, otherwise, different understandings on different eNBs in the MBSFN area will result in the failure of synchronization of control information related to the MCCHs.

DETAILED DESCRIPTION

The invention is invented owing to the above mentioned problems.

The invention provides a method for determining a mapping relation between the MBSFN area and the service area, comprising the following steps: sending the M2 setup request message by the eNB; allocating the MBSFN area identities by the MCE and sending a message with the mapping relation between the MBSFN area and the service area to the eNB by the MCE; and acquiring the mapping relation between the MBSFN area and the service area by the eNB.

Preferably, the MCE sends the message with the mapping relation between the MBSFN area and the service area to the eNB at the same time of sending the MBSFN area identities.

If the MCCH configuration information is not included in the message, the eNB stores the mapping relation until the MCCH configuration information is received so as to carry out the subsequent operations with air interfaces.

In addition, a cell list of cells which can be supported by MBSFN identities is carried while the mapping relation is transmitted.

Preferably, the MCE allocates the MBSFN area identities and sends the mapping relation to the eNB, including: the MCE allocates the MBSFN area identities in accordance with a network planning or the strategies of the operators, wherein the MCCH configuration information is carried; the eNB stores the MCCH configuration information; and the MCE organizes MBMS scheduling information in accordance with the MBMS session message, wherein the scheduling information comprises the mapping relation between the MBSFN area and the service area, and the MCE sends the MBMS scheduling information to the eNB.

After receiving the MBMS scheduling information, the eNB determines the mapping relation between the MBSFN area and the service area by combining the MBMS session message and the stored the MCCH configuration information so as to organize and send system messages.

In addition, a list of cells which can be supported by the MBSFN identities is specified while the MBMS scheduling information is configured.

Preferably, the MCE allocates the MBSFN area identities and sends the mapping relation to the eNB, including: the MCE allocates the MBSFN area identities in accordance with the network planning or the strategies of the operators, wherein the MCCH configuration information is carried; the eNB stores the MCCH configuration information; and the MCE adds the mapping relation between the MBSFN area and the service area to the MBMS session message and sends the MBMS session message to the eNB.

After receiving the MBMS session message, the eNB determines the mapping relation between the MBSFN area and the service area by combining the stored the MCCH configuration information so as to organize and send the system messages.

Further more, a list of cells which can be supported by the MBSFN identities is specified while the MBMS session message is configured.

Additionally, types and MBSFN synchronization area identities corresponding to the cells are assigned while the MCE allocates the MBSFN area identities.

Wherein, the types corresponding to the cells comprise MBSFN cells and the reserved cells of the MBSFN.

The invention provides a system for determining a mapping relation between the MBSFN area and the service area, comprising an M2 setup request message sending device which is positioned in the eNB and used for sending the M2 setup request message to the MCE, a mapping relation message sending device which is used for allocating the MBSFN area identities and sending an message with the mapping relation between the MBSFN area and the service area to the eNB, and an acquiring device which is positioned in the eNB and used for acquiring the mapping relation between the MBSFN area and the service area.

Preferably, the mapping relation message sending device sends the message with the mapping relation between the MBFN area and the service area to the eNB at the same time of transmitting the MBSFN area identities.

If the MCCH configuration information is not included in the message, the eNB stores the mapping relation until the MCCH configuration information is received so as to carry out subsequent operations with the air interfaces.

Additionally, a list of cells which can be supported by the MBSFN identities is carried while the mapping relation is transmitted.

Preferably, the mapping relation message sending device also comprises a single frequency network area identity allocation device which is positioned in the MCE and used for allocating the MBSFN area identities with the MCCH configuration information in accordance with the network planning or the strategies of the operators, a storage device which is positioned in the eNB and used for storing the MCCH configuration information, and a device for organizing the MBMS session message, wherein the device is positioned in the MCE and used for organizing the MBMS scheduling information in accordance with the MBMS session message and sending the MBMS scheduling information to the eNB, wherein the MBMS scheduling information includes the mapping relation between the MBSFN area and the service area.

The system also comprises a mapping relation determination device which is positioned in the eNB and used for determining the mapping relation between the MBSFN area and the service area by combining the MBMS session message and the stored MCCH configuration information after receiving the MBMS scheduling information so as to organize and send the system messages.

In addition, a list of cells which can be supported by the MBSFN identities is shown while the MBMS scheduling information is configured.

Preferably, the mapping relation message sending device also comprises a single frequency network area identity allocation device which is positioned in the MCE and used for allocating the MBSFN area identities with the MCCH configuration information in accordance with the network planning or the strategies of the operators, a storage device which is positioned in the eNB and used for storing the MCCH configuration information, and a mapping relation addition device which is positioned in the MCE and used for adding the mapping relation between the MBSFN area and the service area to the MBMS session message and sending the MBMS session message to the eNB.

The system also comprises a mapping relation determination device which is positioned in the eNB and used for determining the mapping relation between the MBSFN area and the service area by combining the stored MCCH configuration information after receiving the MBMS session message so as to organize and send the system messages.

Additionally, a list of cells which can be supported by the MBSFN identities is shown while the MBMS session message is configured.

Furthermore, the types and MBSFN synchronization area identities corresponding to the cells are specified while the MCE allocates the MBSFN area identities.

The types corresponding to the cells comprise the MBSFN cells and the reserved cells of the MBSFN.

The mapping relation between the MBSFN area and the MBMS area can be defined by the technical scheme of the invention, thus ensuring the synchronization transmission demand of the MBSFN with the air interfaces.

Other characteristics and advantages of the invention will be detailed in the following description and obvious in the description partially or known by implementing the invention. The purposes and other advantages of the invention will be realized and obtained through structures specified in the description, claims and drawings specially.

BRIEF DESCRIPTION OF THE DRAWINGS

The drawings here help to understand the invention further, which is a part of the application. Schematic embodiments of the invention and descriptions thereof are used for explaining the invention but not limit the invention improperly, in which:

FIG. 1 is a schematic view of relations between the existing MBMS area and the MBSFN synchronization area and the like;

DETAILED IMPLEMENTATION OF THE DRAWINGS

Embodiments will be detailed below with reference to the drawings.

Figure 1:
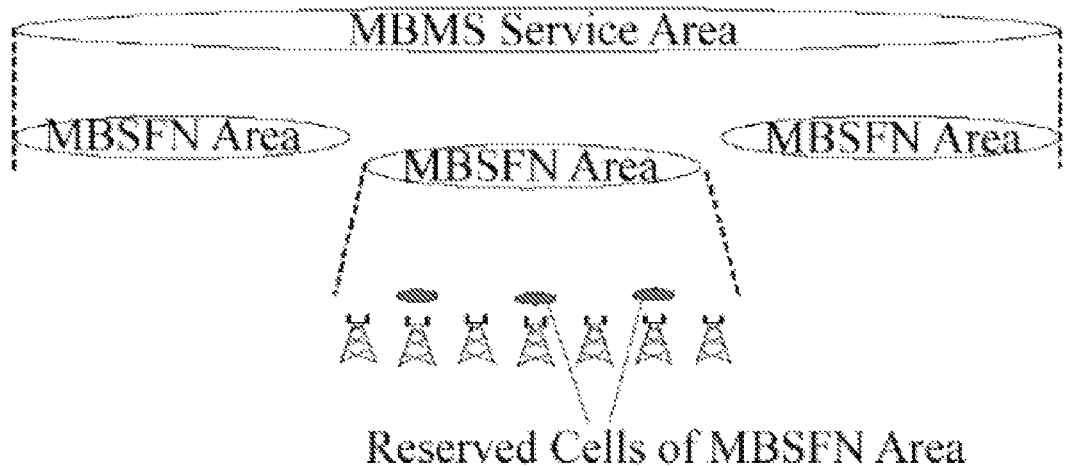
Figure 2:
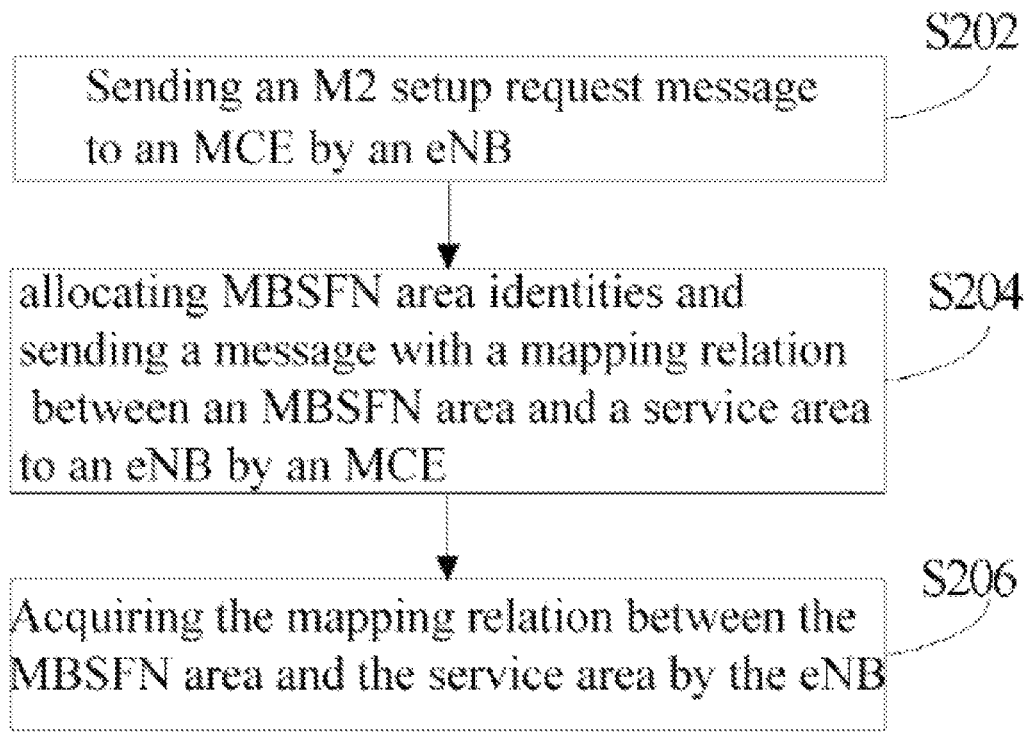
FIG. 2 is a flow chart of a method for determining the mapping relation between the MBSFN area and the service area according to the invention.

FIG. 2 is a flow chart of a method for determining the mapping relation between the MBSFN area and the service area according to the invention.

Referring to FIG. 2, the method of the invention comprises the following steps: Step 202, sending the M2 setup request message to the MCE by the eNB; Step 204, allocating the MBSFN area identities by the MCE and sending the message with the mapping relation between the MBSFN area and the service area to the eNB by the MCE; and Step 206, acquiring the mapping relation between the MBSFN area and the service area by the eNB.

Figure 3:
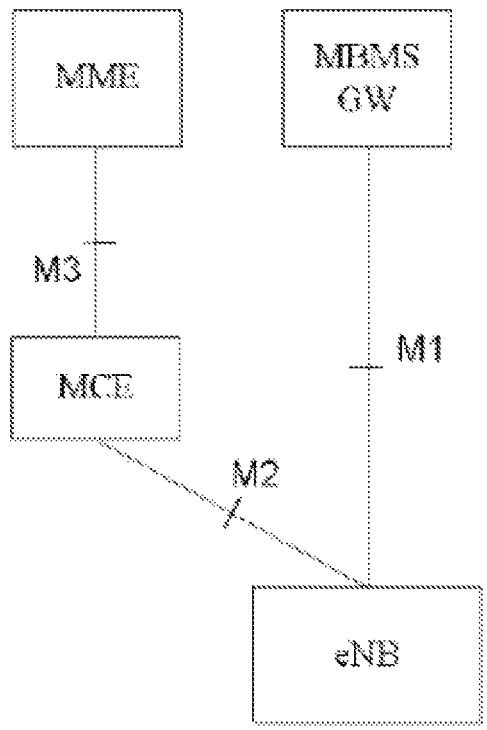
FIG. 3 is a schematic view of logical architecture of the existing LTE MBMS.

FIG. 3 is a schematic view of logical architecture of the existing LTE MBMS.

Referring to FIG. 3, the MCE which is taken as an integrated node at a radio access network (RAN) side and an M2 interface which is taken as a logical interface between the MCE and the eNB are used for transmitting the MBSFN area identities and the MCCH configuration information and forwarding a session starting or ending message from the MME and the scheduling information of the MME for the MBMS.

Wherein, M1 is a user plane interface, M2 is a control plane interface inside E-UTRAN (evolved universal terrestrial radio access network), and an M3 is a control plane interface between the E-UTRAN and an evolved packet core (EPC).

In solving the above mentioned problems, a method is provided in that, notifying the eNB of the mapping relation between the MBSFN area and the MBMS area in the process of transmitting the MBSFN area identities after the MCE receives configuration information of the MBMS areas from the eNB by the M2 interface, so that each eNB in different MBSFN areas has the same configuration understanding. If the MCCH configuration information is allocated while the mapping relation is allocated, each eNB sends system information in the assigned cell in the specified time; otherwise, each eNB stores the mapping relation until each eNB receives the MCCH configuration information specified by the MBSFN identities and then performs the subsequent transmission operation with the air interfaces. Table 1 shows cell format of the mapping relation as follows:

TABLE 1

| Information Type | Information Description |
| --- | --- |
| MBSFN Identity List | |
| >MBSFN Identity | MBSFN area identity |
| >Related information of MCCH configuration | Specifying the related MCCH configuration, which is optional (available independent configuration in the subsequent process) |
| > MBMS Service area List | Specifying the MBMS service area List (including one or more MBMS service areas) |

The following description is detailed by adopting the first embodiment of the method.

The First Embodiment

Figure 4:
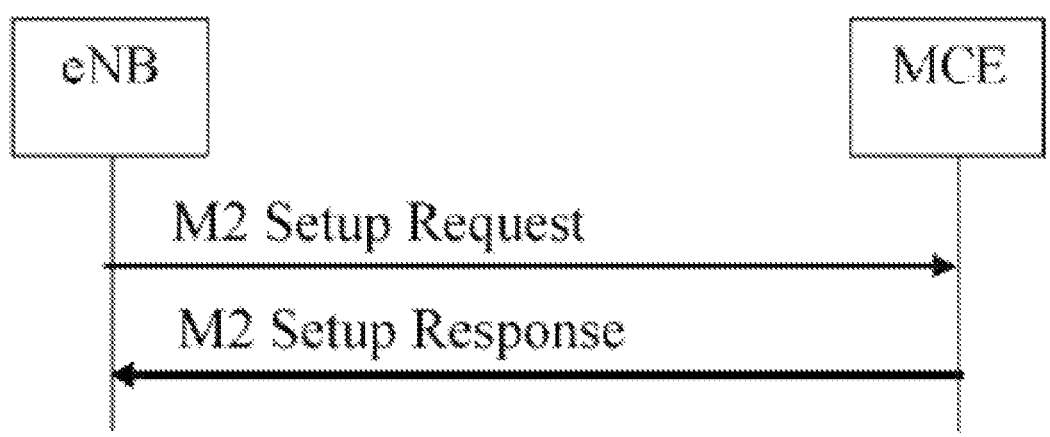
FIG. 4 is a flow chart of a method for determining the mapping relation between the MBSFN area and the service area according to a first embodiment of the invention.

FIG. 4 is a flow chart of a method for determining the mapping relation between the MBSFN area and the service area according to the first embodiment of the invention.

Referring to the FIG. 4, the process comprises the following steps:

Step 1, the eNB sends the M2 setup request message to the MCE, wherein the MBMS area information of each cell is carried;

Step 2, the MCE allocates the MBSFN area identities and the mapping relation related to the MBMS area in accordance with the network planning or the strategies of the operators, etc., including the MBSFN identities, the MCCH configuration information (optional) in each MBSFN area, and the MBMS areas, etc.; and then the MCE sends the messages to the eNB; and Step 3, the eNB organizes the system messages in accordance with the received message.

It should be noted that the eNB stores the mapping relation until the MCCH configuration information are received and then performs the subsequent operations with the air interfaces if the MCCH configuration information is not included in the step 2.

An alternative method is provided in that, when the MBMS scheduling information is configured, MBSFN ID is carried to specify the mapping relation of the MBMS, and then the mapping relation between the MBMS and the MBMS area can be obtained by the MBMS session message, thus the association between the MBMS area and the MBMS area can be made. Table 2 shows cell format of the mapping relation:

TABLE 2

| Information Type | Information Description |
| --- | --- |
| MBSFN Identity List | |
| >MBSFN Identity | MBSFN area identity |
| >Related information of PMCH Configuration List | Specifying the related MCCH configuration, which is optional (available independent configuration in the subsequent process) |
| >>PMCH Configuration | Specifying configuration information of each PMCH (MCS and resource division point) |

TABLE 2-continued

| Information Type | Information Description |
|---|---|
| >>MBMS session List | Specifying all multiplexed MBMS information in the MBSFN area |
| >MBMS sub-frame Allocation | Specifying all physical resources used by PMCHs in the MBSFN area |

The following description is detailed by adopting second and third embodiments of the second method.

The Second Embodiment

Figure 5:
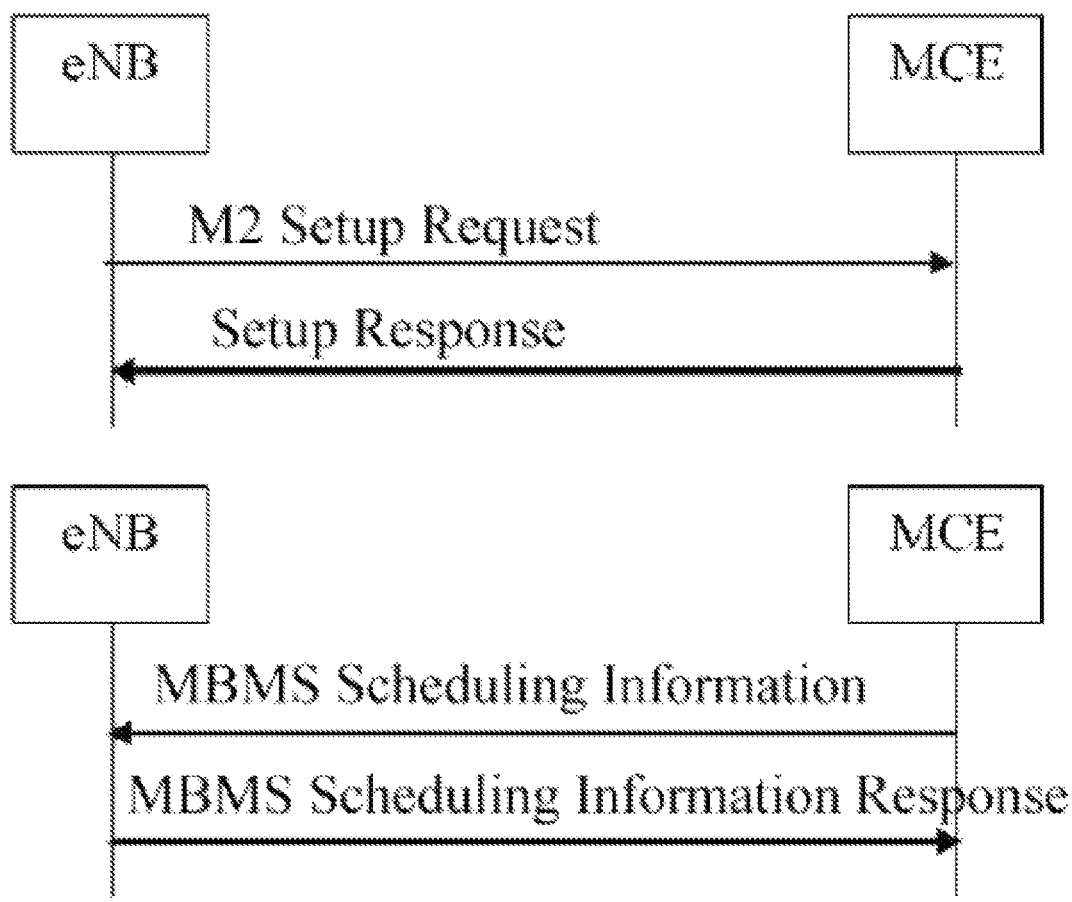
FIG. 5 is a flow chart of a method for determining the mapping relation between the MBSFN area and the service area according to a second embodiment of the invention.

FIG. 5 is a flow chart of a method for determining the mapping relation between the MBSFN area and the service area according to the second embodiment of the invention. The process comprises the following steps:

Step 1, the eNB sends an M2 setup request message to the MCE, wherein the MBMS area information of each cell is carried;

Step 2, the MCE allocates the MBSFN area identities in accordance with the network planning or the strategies of the operators, etc., including the MBSFN identities and the MCCH configuration information in each MBSFN area, etc., and then the MCE sends the message to the eNB;

Step 3, each eNB stores the MCCH configuration information, etc.;

Step 4, the MCE organizes the MBMS scheduling information which includes the mapping relation between the MBSFN area and the MBMS area in accordance with the MBMS session message, including the MBSFN identities, PMCH configuration information of each MBSFN area, an MBMS list and the like, and the MCE sends the messages to the eNB; and Step 5, the eNB finally determines the mapping relation between the MBSFN area and the MBMS area in accordance with the received message combining the MBMS session message and the MCCH configuration information stored in the step 3, and then the eNB organizes the system messages and performs the subsequent transmission operations of the MCCH.

The Third Embodiment

Figure 6:
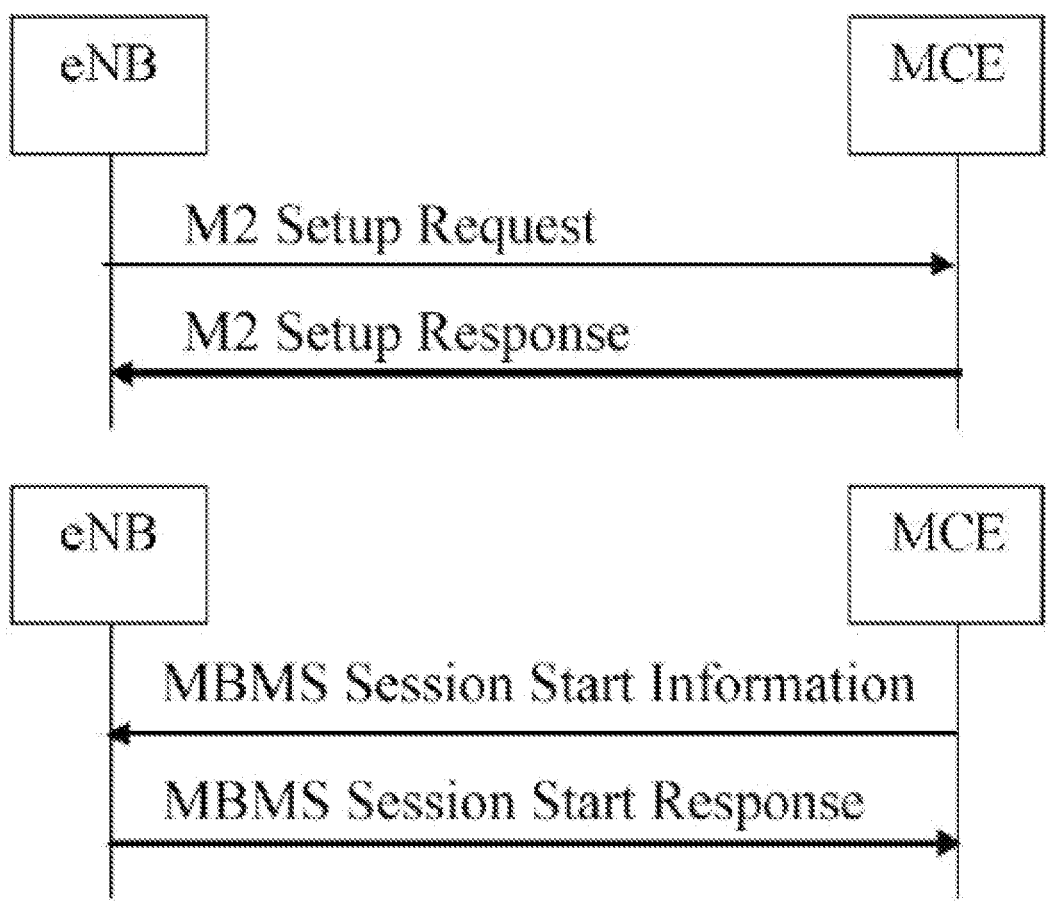
FIG. 6 is a flow chart of a method for determining the mapping relation between the MBSFN area and the service area according to a third embodiment of the invention.

FIG. 6 is a flow chart of a method for determining the mapping relation between the MBSFN area and the service area according to the third embodiment of the invention. The process comprises the following steps:

Step 1, the eNB sends an M2 setup request message to the MCE, wherein the MBMS area information of each cell is carried;

Step 2, the MCE allocates the MBSFN area identities in accordance with the network planning or the strategies of the operators, etc., including the MBSFN identities and the MCCH configuration information in each MBSFN area, etc., and then the MCE sends the messages to the eNB;

Step 3, each eNB stores the above mentioned MCCH configuration information, etc.;

Step 4, when the MCE sends the MBMS session message, the mapping relation between the MBSFN area and the MBMS area is added, including MBSFN identities, MBMS attributes, MBMS area and the like, and then the MCE sends the messages to the eNB; and Step 5, the eNB finally determines the mapping relation between the MBSFN area and the MBMS area in accordance with the received messages combining the MCCH configuration information stored in the step 3 and then organizes and sends the system messages.

Additionally, if one eNB is considered to belong to different cells in the same service area, a mapping relation of Cell IDs should be introduced in the two methods above when different MBSFN areas are allocated, that is, an available Cell list should be carried when the mapping relation between the MBSFN area and the MBMS area is transmitted in the first method. And in the second method, a Cell list available for MBSFN IDs may be specified when the session message is configured, and a Cell list available for MBSFN ID is specified when MBMS scheduling information is configured.

Due to addition of the available cell lists, the cell formats of the two methods are changed. Table 3 and table 4 below show cell formats of the first method and the second method respectively after the available cell lists are added.

TABLE 3

| Information Type | Information Description |
|---|---|
| MBSFN Identity List | |
| >MBSFN Identity | MBSFN area Identity |
| >Related information of MCCH Configuration | Specifying the related MCCH configuration, which is optional (available independent configuration in the subsequent process) |
| >MBMS Service area | Specifying MBMS area |
| >Cell List | |
| >>E-UTRAN CGI | Specifying logical cell mapped to MBSFN area |

TABLE 4

| Information Type | Information Description |
|---|---|
| MBSFN Identity List | |
| >MBSFN Identity | MBSFN area Identity |
| >Related information of MCCH Configuration | Specifying the related MCCH configuration, which is optional (available independent configuration in the subsequent process) |
| >Cell List | |
| >>E-UTRAN CGI | Specifying logical cell mapped to MBSFN area |

On this circumstance, other processing modes are same as those in the first, second and third embodiments, and redundant descriptions will not be repeated.

Additionally, there is another case that it is required to consider the type of the cell and the MBSFN synchronization area, that is, types corresponding to the cells are required to specified, such as MBSFN cells or MBSFN reserved cells (the former plays a role in performing transmission of the MBSFN and the latter doesn't); in addition, the corresponding MBSFN synchronization area identity is required to be specified.

The cell formats of the above mentioned methods are changed due to addition of the cell types and the corresponding identity of the MBSFN synchronization area, And table 5 and table 6 below show cell formats of the first and second methods respectively after the cell types and the corresponding identity of the MBSFN synchronization area are added.

On this circumstance, other processing modes are same as those in the first, second and third embodiments, and redundant descriptions will not be repeated.

TABLE 5

| Information Type | Information Description |
| --- | --- |
| MBSFN Identity List | |
| >MBSFN Identity | MBSFN area Identity |
| >Related information of MCCH Configuration | Specifying the related MCCH configuration, which is optional (available independent configuration in the subsequent process) |
| >MBMS area | Specifying MBMS area |
| >Cell List | |
| >> E-UTRAN CGI | Specifying logical cell mapped to MBSFN area |
| >> Cell Type | Specifying MBSFN cell and MBSFN reserved cell |
| >MBSFN Sync area | Specifying MBSFN synchronization area |

TABLE 6

| Information Type | Information Description |
| --- | --- |
| MBSFN Identity List | |
| >MBSFN Identity | MBSFN area Identity |
| >Related information of MCCH Configuration | Specifying the related MCCH configuration, which is optional (available independent configuration in the subsequent process) |
| >Cell List | |
| >> E-UTRAN CGI | Specifying logical cell mapped to MBSFN area |
| >> Cell Type | Specifying MBSFN cell and MBSFN reserved cell |
| >MBSFN Sync area | Specifying MBSFN synchronization area |

Figure 7:
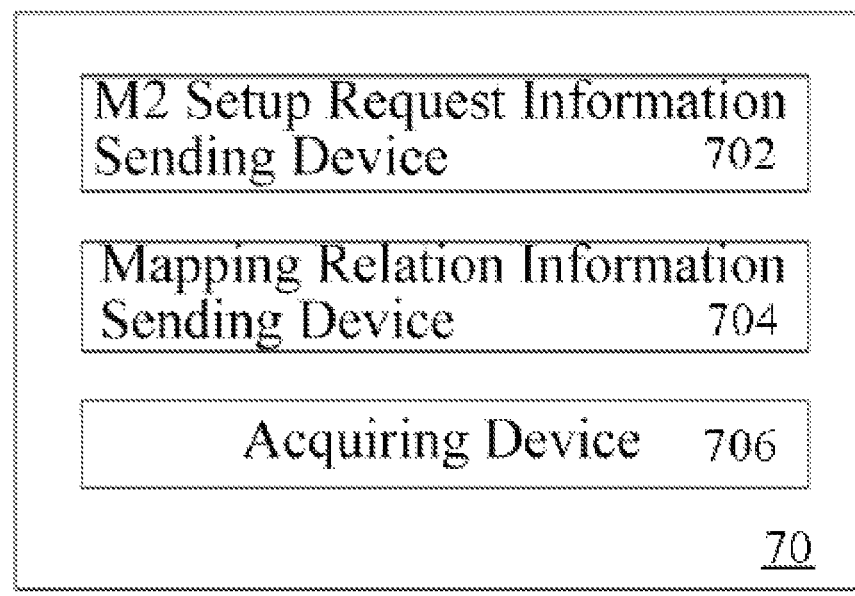
FIG. 7 is a block diagram of a system for determining the mapping relation between the MBSFN area and the service area according to the invention.

FIG. 7 is a block diagram of a system for determining the mapping relation between the MBSFN area and the service area according to the invention.

Referring to FIG. 7, a system 70 for determining the mapping relation between the MBSFN area and the service area according to the invention comprises: an M2 setup request message sending device 702 which is positioned in an eNB and used for sending an M2 setup request message to the MCE, a mapping relation message sending device 704 for allocating the MBSFN area identities and sending a message with the mapping relation between the MBSFN area and the service area to the eNB, and an acquiring device 706 which is positioned in the eNB and used for acquiring the mapping relation between the MBSFN area and the service area.

In conclusion, in the invention, the MCE notifies the eNB of the mapping relation between the MBSFN area and the MBMS area in the process of sending the MBSFN area identities; or the MCE specifies the MBMS mapping relation by carrying MBSFN ID when the MCE configures the MBMS scheduling information, and then the MCE can obtain the mapping relation between the MBMS and the MBMS area by MBMS session message; or the mapping relation between the MBSFN area and the MBMS area is added when the MCE sends the MBMS session message.

Additionally, the MCE may send the mapping relation between the MBSFN area and the MBMS area and carry the available Cell lists simultaneously; or the MCE specifies the Cell list available for MBSFN ID when configuring the MCCH information; or the MCE specifies the Cell list available for MBSFN ID when configuring the MBMS scheduling information.

Additionally, the MCE is required to specify the types (i.e. MBSFN area or MBSFN reserved cell) corresponding to the cells and the identity corresponding to the MBSFN synchronization area in the process of transmitting the MBSFN area identities.

As mentioned above, the mapping relation between the MBSFN area and the MBMS area can be defined by the technical scheme of the invention with respect to existing technologies, thus ensuring the synchronization transmission demand of the MBSFN with the air interfaces. The preferable embodiments of the invention have been illustrated and described as stated above but not limit the invention, and the various modifications, substitutions and adaptations which are made to the invention by those ordinarily skilled in the art should be within the protection range of the invention without departing from the principle and spirit of the invention.

The invention claimed is:

1. A method for determining a mapping relation between a multicast broadcast single frequency network (MBSFN) area and a service area comprising the steps of:

receiving, by a multicast coordination entity (MCE), an M2 setup request message sent by an eNB, wherein MBMS area information of each cell is carried; and allocating, by the MCE, MBSFN area identities and sending a message with the mapping relation between the MBSFN area and a service area to the eNB so that the eNB can acquire the mapping relation between the MBSFN area and the service area, wherein the MCE sends the message with the mapping relation between the MBSFN area and the service area to the eNB at the same time of transmitting the MBSFN area identities; and wherein, if multicast control channel (MCCH) configuration information is not included in the message, the eNB stores the mapping relation until the MCCH configuration information is received so as to perform subsequent operations with air interfaces.

2. The method according to claim 1, wherein a cell list available for MBSFN identities is carried while the mapping relation is transmitted.

3. The method according to claim 1, wherein the step of allocating the MBSFN area identities and sending the mapping relation to the eNB further comprises the steps of:

allocating, by the MCE, the MBSFN area identities in accordance with the network planning or strategies of operators, wherein the MCCH configuration information is carried;

storing the MCCH configuration information by the eNB; and organizing MBMS scheduling information by the MCE in accordance with an MBMS session message, in which the mapping relation between the MBMS area and the service area is included, and sending the MBMS scheduling information to the eNB by the MCE;

wherein, the eNB determines the mapping relation between the MBSFN area and the service area by combining the MBMS session message and the stored MCCH configuration information in accordance with the received MBMS scheduling information, so as to organize and send a system message.

4. The method according to claim 3, wherein a cell list available for MBSFN identities is specified while the MBMS scheduling information is being configured.

5. The method according to claim 1, wherein the step of allocating the MBSFN area identities and sending the mapping relation to the eNB further comprises the steps of:

allocating, by the MCE, the MBSFN area identities in accordance with network planning or strategies of operators, wherein the MCCH configuration information is carried;

storing the MCCH configuration information by the eNB; and adding the mapping relation between the MBSFN area and the service area to the MBMS session message and sending the MBMS session message to the eNB by the MCE;

wherein, the eNB determines the mapping relation between the MBSFN area and the service area by combining the stored MCCH configuration information in accordance with the received MBMS session message, so as to organize and send a system message.

6. The method according to claim 5, wherein a cell list available for the MBSFN identities is specified while the MBMS session message is being configured.

7. The method according to claim 1, wherein the MCE specifies types and MBSFN synchronization area identities corresponding to the cells while the MCE is allocating the MBSFN area identities.

8. The method according to claim 7, wherein the types corresponding to the cells comprise MBSFN cells and MBSFN reserved cells.

9. A system for determining a mapping relation between an MBSFN area and a service area, comprising:
    a receiving module for receiving an M2 setup request message sent by an eNB, wherein MBMS area information of each cell is carried; and
    a mapping relation message sending device for allocating the MBSFN area identities and sending a message with a mapping relation between the MBSFN area and the service area to the eNB, wherein the eNB stores the mapping relation until MCCH configuration information is received so as to perform subsequent operations with air interfaces if the MCCH configuration information is not included in the message.

10. The system according to claim 9, wherein the mapping relation message sending device transmits the MBSFN area identities and sends a message with the mapping relation between the MBSFN area and the service area to the eNB simultaneously.

11. The system according to claim 9, wherein, a cell list available for the MBSFN identities is carried while the mapping relation is transmitted.

12. The system according to claim 9, wherein the mapping relation message sending device further comprises:
    an MBSFN identity allocation device which is positioned in the MCE and used for allocating the MBSFN area identities in accordance with the network planning or strategies of an operator, wherein the MCCH configuration information is carried;
    a storage device which is positioned in the eNB and used for storing the MCCH configuration information; and
    an MBMS scheduling information organization device which is positioned in the MCE and used for organizing the MBMS scheduling information in accordance with the MBMS session message and sending the MBMS scheduling information to the eNB, wherein the MBMS scheduling information comprises the mapping relation between the MBSFN area and the service area, and a cell list available for the MBSFN identities is specified while the MBMS scheduling information is being configured.

13. The system according to claim 9, wherein the mapping relation message sending device further comprises:
    an MBSFN area identity allocation device which is positioned in the MCE and is used for allocating the MBSFN area identities in accordance with the network planning or strategies of an operator, wherein the MCCH configuration information is carried; and
    a mapping relation addition device which is positioned in the MCE and used for adding the mapping relation between the MBSFN area and the service area to an MBMS session message and sending the MBMS session message to the eNB so that the eNB determines the mapping relation between the MBSFN area and the service area by combining the MCCH configuration information in accordance with the received MBMS session message and then organizes and sends a system message, wherein a cell list available for the MBSFN identities is specified while the MBMS session message is being configured.

14. The system according to claim 9, wherein, the MCE allocates the MBSFN identities and specifies types and MBSFN synchronization area identities corresponding to the cells simultaneously, wherein the types corresponding to the cells comprise MBSFN cells and MBSFN reserved cells.

15. A system for determining a mapping relation between an MBSFN area and a service area, comprising:
    an M2 setup request message sending device which is positioned in an eNB and used for sending an M2 setup request message to an MCE, wherein MBMS area information of each cell is carried; and
    an acquiring device which is positioned in the eNB and used for receiving a message with the mapping relation between the MBSFN area and the service area sent by the MCE and acquiring the mapping relation between the MBSFN area and the service area, wherein the eNB stores the mapping relation until MCCH configuration information is received so as to perform subsequent operations with air interfaces if the MCCH configuration information is not included in the message.

16. The system according to claim 15, wherein comprising:
    a storage device which is positioned in the eNB and used for storing the MCCH configuration information, wherein the MCCH configuration information is carried by MBSFN area identities allocated by the MCE in accordance with the network planning or the strategies of the operators; and
    a mapping relation determination device which is positioned in the eNB and used for determining the mapping relation between the MBSFN area and the service area so as to organize and send system messages by combining an MBMS session message and the stored MCCH configuration information in accordance with the received MBMS scheduling information, wherein the MBMS scheduling information is organized by the MCE in accordance with the MBMS session message and the MBMS scheduling information includes the mapping relation between the MBSFN and the service area; or the mapping relation determination device is used for determining a mapping relation between the MBSFN area and the service area included in the MBMS session message after receiving the MBMS session message, wherein the MBSFN session message includes the mapping relation between the MBSFN and the service area.

* * * * *

UNITED STATES PATENT AND TRADEMARK OFFICE
CERTIFICATE OF CORRECTION

PATENT NO.         : 9,042,292 B2
APPLICATION NO.    : 13/521430
DATED              : May 26, 2015
INVENTOR(S)        : Dajun Zhang et al.

Page 1 of 1

It is certified that error appears in the above-identified patent and that said Letters Patent is hereby corrected as shown below:

In the claims, column 12, line 35, delete "wherein"

Signed and Sealed this
Sixth Day of October, 2015

Michelle K. Lee
*Director of the United States Patent and Trademark Office*

UNITED STATES PATENT AND TRADEMARK OFFICE
CERTIFICATE OF CORRECTION

PATENT NO.         : 9,042,292 B2
APPLICATION NO.    : 13/521430
DATED              : May 26, 2015
INVENTOR(S)        : Dajun Zhang et al.

Page 1 of 1

It is certified that error appears in the above-identified patent and that said Letters Patent is hereby corrected as shown below:

In the claims, column 12, line 37, delete "wherein"

This certificate supersedes the Certificate of Correction issued October 6, 2015.

Signed and Sealed this
Eighth Day of March, 2016

Michelle K. Lee
*Director of the United States Patent and Trademark Office*